April 10, 1951 E. SHIMIZU 2,548,323
FILM DEVELOPER REEL AND LOADER THEREFOR
Filed Feb. 18, 1949 2 Sheets-Sheet 1
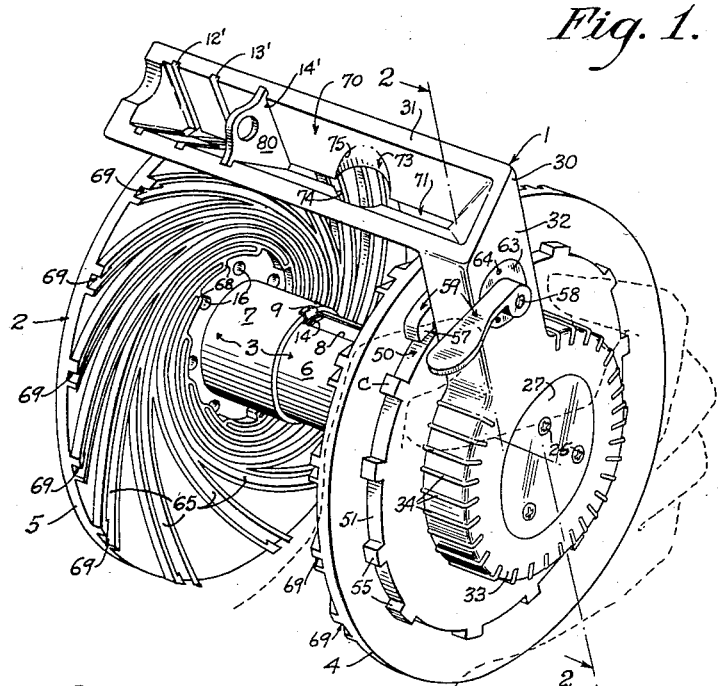
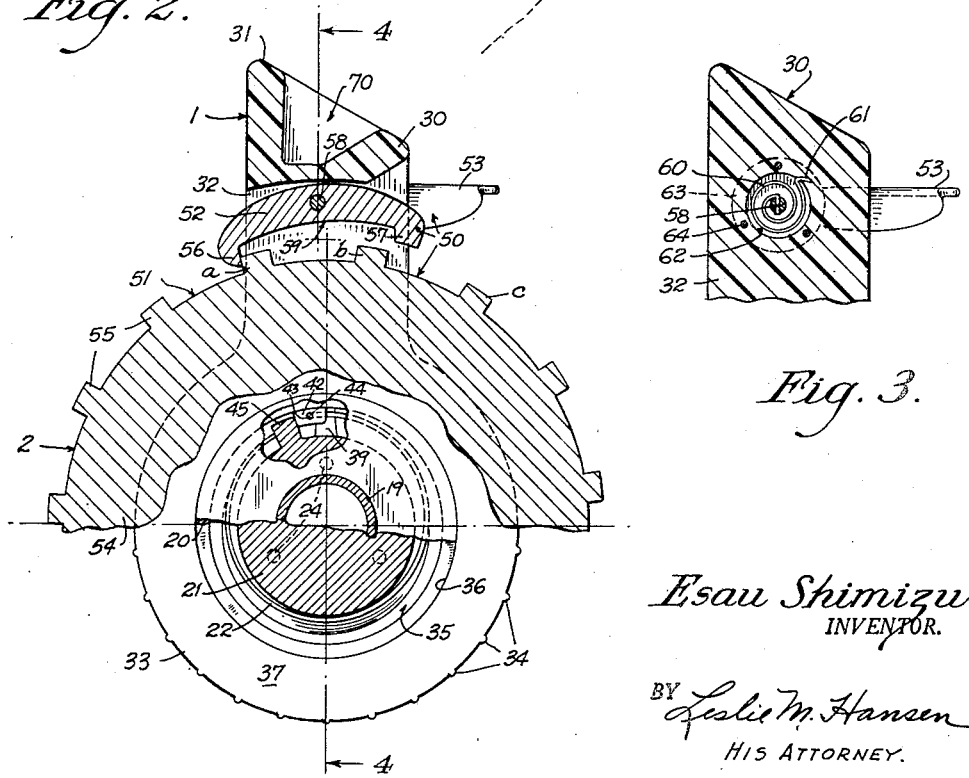
Esau Shimizu
INVENTOR.
BY Leslie M. Hansen
HIS ATTORNEY.

April 10, 1951  E. SHIMIZU  2,548,323
FILM DEVELOPER REEL AND LOADER THEREFOR
Filed Feb. 18, 1949  2 Sheets-Sheet 2
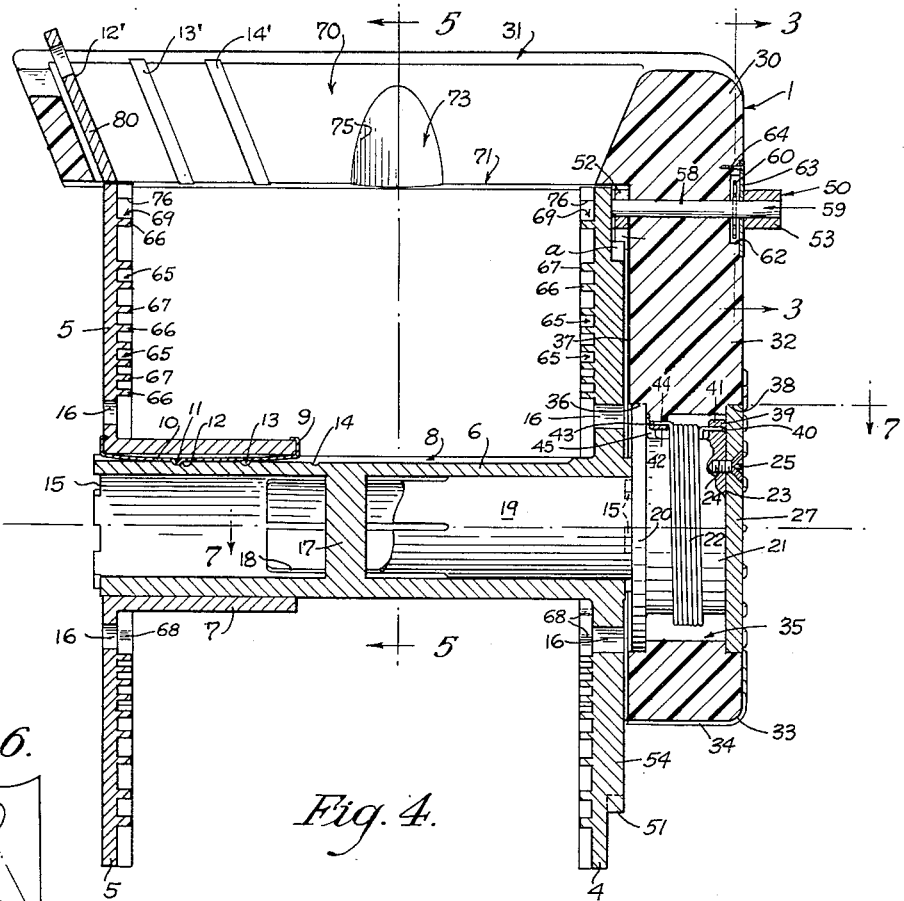
Esau Shimizu
INVENTOR.
BY Leslie M. Hansen
HIS ATTORNEY.

Patented Apr. 10, 1951

2,548,323

UNITED STATES PATENT OFFICE 2,548,323

FILM DEVELOPER REEL AND LOADER THEREFOR

Esau Shimizu, San Jose, Calif.

Application March 18, 1949, Serial No. 82,099

10 Claims. (Cl. 95—100)

This invention relates to apparatus to be used in connection with the developing of photographic film and more particularly relates to a device for loading cut film into a developing frame.

The films for which the present invention is best adapted are known as flat pack film generally put up in packs of twelve, but it should be noted that any film which has been cut to proper length may be handled by the loader of the present invention.

In the course of developing, the film must be handled under darkness, i. e., in a darkroom, which presents numerous difficulties insofar as the person handling the film is concernel. It is the practice to arrange the film in suitable spaced relation within a rack or some such frame so as to assure complete bathing of each film in the developing solution. Should several films contact one another prior to affixation of the photo-sensitive emulsion thereon, the subject matter imprinted on such film is damaged and ofttimes is destroyed.

Various types of film holders have been used and among the most popular is the reel type film holder provided with opposite discs having corresponding radially disposed grooves each adapted to receive the edge of a film to hold the individual film in spaced relation and yet permit exposure of all sides thereof to the developing solution.

The present invention is concerned with the loading of reel type film holders for the purpose of facilitating loading of the film into the reel in a proper manner. Accordingly, it is one object of this invention to provide a reel loader which a person can hold in one hand and feed the film into the reel with the other or free hand.

Another object is to provide a reel loader so combined with a reel as to facilitate one hand step by step advancement of the reel to automatically position the film holding grooves of the reel for the reception of a film.

Yet another object is to provide a reel loading device with a film guiding funnel so associated with the intermittently advanceable reel as to assure positive insertion of the film into consecutive film holding grooves thereof.

Still another object is to provide a reel loader with a funnel so constructed as to enable the operator to check whether or not a film is already disposed in a particular set of grooves of the reel.

A further object of this invention is to provide a combined reel and loader therefor adapted to handle flat pack film of various sizes.

It is a still further object of this invention to provide a reel adapted for coupling with a reel loader in a simple and facile manner.

Other objects and advantages of the present invention will become apparent from a reading of the following description in the light of the drawings in which:

Fig. 1 is a perspective view of a reel and loading device embodying the present invention.

Fig. 2 is a section of Fig. 1 taken along line 2—2 thereof and with certain parts thereof broken away for purposes of illustration.

Fig. 3 is a fragmentary section of a portion of the loader shown in Fig. 1 and as taken substantially along line 3—3 in Fig. 4.

Fig. 4 is a transverse section of Fig. 2 taken along line 4—4 thereof.

Fig. 5 is a fragmentary section taken along line 5—5 of Fig. 4.

Fig. 6 is an elevation of an insert employed in the loading device.

Fig. 7 is an exploded section partially in elevation of a spindle embodied in the present invention and taken substantially along line 7—7 in Fig. 4.

Fig. 8 is a fragmentary section through a film holding groove and taken along line 8—8 in Fig. 5.

The reel loader of the present invention as generally designated by reference numeral 1 is adapted for use with a reel 2 for providing a simple compact unit which can be held in one hand as indicated by the dotted line delineation of a right hand in Figure 1 of the drawings.

While film loading reels as such generally vary in form, for purposes of the present invention the reel 2 has certain structural characteristics common to or for adopting it to the reel loader 1 so that the reel and loader will cooperate with one another for carrying out the principal objects of this invention.

In general the reel 2 has the attributes of an enlarged spool in that it comprises a hub 3 flanked by two discs 4 and 5 disposed parallel to each other and concentrically attached to the hub 3.

The two discs 4 and 5 are adapted to be shifted toward or away from each other so as to accommodate film of various width. To this end the hub 3 is constructed to provide telescoping sections 6 and 7, the section 6 being formed integrally with the disc 4 while the section 7 is formed integrally with the disc 5. The hub section 6 extends the full width of the reel while the section 7 consists of a relatively short sleeve slidably fitting the hub section 6 for axial movement relative to the same.

The outer wall of the hub 6 is provided with a longitudinal groove 8 parallel to the axis thereof for guiding a flat spring 9 lengthwise of the hub. The spring 9 has its ends embedded sufficiently into the hub section 7 so as to key the sections 6 and 7 as well as the discs 4 and 5 to each other for unitary rotary movement. The medial portion 10 of spring 9 is disposed within the hub section 7 and is provided with a detent 11 adapted to seat in one or another recess 12, 13 or 14 formed in the floor of groove 8 for maintaining the discs 4 and 5 in the desired spaced relation for either wide, medium or narrow film, respectively.

It should here be noted that each of the hub sections 6 and 7 project slightly beyond the outer face of the related disc 4 and 5, respectively, and that these projecting portions of the hub are castellated as shown at 15. The castellations 15 are for purpose of allowing infiltration of developing fluid into the hollow center of the hub when the end thereof is resting on the floor of a developing tank during the developing bath. The discs 4 and 5 are also provided with a plurality of apertures 16 adjacent the hub sections to allow circulation of developing solution from one to the other side of the discs during the developing bath.

The hub section 6 is provided with a diametrically disposed wedge-like lug 17, Figs. 4, 5 and 7, adapted to fit into a substantially V-like crevice 18 formed in the open end of a spindle 19. The spindle 19 has a flange 20 against which the castellated end of the hub section 6 abuts. Beyond the flange 20 the spindle is provided with a concentric shank 21 adapted to be encircled by a coil spring 22. The end face 23 of the shank 21 is provided with tapped bores 24 for receiving screws 25 by which an end plate 27 is secured to the shank 21.

Referring to Fig. 4 it will be noted that the reel loader 1 is in the form of an L-shaped frame 30. This frame 30 is preferably made of plastic material such as Bakelite, hard rubber and the like molded to provide an arm 31 adapted to overlie and span the gap between the discs 4 and 5 when they are in their extreme spaced position, i. e., adjusted for the reception of wide film. The other arm 32 of the L-shaped frame is disposed radially of the disc 4 and has an enlarged handle portion 33 adapted to be gripped between the heal of one's hand and the fingers thereof, as is illustrated in Fig. 1.

The handle 33 is in the form of a knob having suitable ribs 34 on its periphery to prevent slippage and is provided with an axial passage 35, Fig. 4, to receive the flange 20, shank 21 and end plate 24 of the spindle 19. To this end the arm 32 is provided with a shoulder formation 36 adjacent its inner face 37 and a similar shoulder formation 38 adjacent the outer face of the handle 33. These shoulders 36 and 38 are concentric to the passage 35 and embrace the same so as to receive the flange 20 and plate 27 respectively, of the spindle.

The shank 21 is provided with a projection 39 having an opening 40 in which one end 41 of the coil spring 22 is hooked, Figs. 2 and 4. The arm 32 is provided with a similar projection 42 within the passage 35 and having an opening 43 in which the opposite end 44 of the coil spring 22 is hooked. Before the spring 22 is connected, as just explained, the convolutions of the coil spring 22 are wound suitably tight so as to create a spring load for urging the spindle 19 in a counter clockwise direction as seen in Fig. 2. The spring 22 is normally set in initial, i. e. wound, condition as shown with a stop lug 45 formed on the shank 21 bearing against the projection 42 of the arm 32.

An escapement mechanism 50 is provided for the purpose of restraining movement of the spindle under the influence of the spring 22 and for effecting a step by step release of the spring loaded spindle as desired. This escapement mechanism comprises a ratchet 51, a pawl 52 and a thumb actuated lever 53 for controlling the pawl 52.

The ratchet 51 is disposed on the outer side wall of the disc 4 adjacent the inner face 37 of the arm 32 upon which the handle 33 is formed. The ratchet comprises a disc-like projection 54 which may be attached to the disc 4 or formed as an integral part thereof in concentric relation with respect thereto. The periphery of the projection 54 is provided with a plurality of teeth 55 which are equally spaced from each other.

The pawl 52 is disposed in the same plane as the ratchet 51 beneath the arm 31 of the L-shaped frame 30, and is provided with teeth 56 and 57 at its respective ends adapted to engage the teeth 55 of the ratchet 51. The pawl 52 is secured to one end of a rock-shaft 58 which extends through the arm 32 of the frame 30 in a plane parallel to the axis of the spindle 19. The shaft 58 projects beyond the outer face of the arm 32 and the thumb lever 53 is secured to outer end of the shaft 58 in any suitable manner.

From the foregoing it is apparent that the thumb lever, shaft and pawl comprise a control structure 59 which rocks as a unit, the rocking movement of which is limited by reason of the proximity of the pawl with respect to the ratchet 51. The control structure 59 as seen in Fig. 3 is normally urged toward one of its limits of movement by a coil spring 60 having one end passing through the shaft 58 and its opposite end anchored in a slot 61 formed in the periphery of a recess 62 provided in the arm 32 of the frame 30. The recess 62 is closed by a plate 63 secured to the frame 32 by brads 64.

Referring to Fig. 2 it will be noted that the tooth 56 of the pawl 52 normally engaged one ratchet tooth $a$ to restrain movement of the ratchet, reel and spindle in a counter clockwise direction under the influence of the coil spring 22. Conversely, upon depression of the thumb lever 53, the pawl 52 is rocked clockwise Fig. 2 thus moving the pawl tooth 56 out of engagement with the ratchet tooth $a$ and simultaneously moving pawl tooth 57 into a position to engage the ratchet tooth $c$. The ratchet 51 and its associated parts are therefore released for movement under the influence of spring 22 until the ratchet tooth $c$ abuts the pawl tooth 57. Upon subsequent release of the thumb lever the latter and pawl 52 are returned to normal position by the spring 60 so that the pawl tooth 56 now rocks into a position to obstruct the ratchet tooth $b$ while the pawl tooth 57 releases the ratchet tooth $c$.

In the foregoing manner the spindle and reel are allowed to advance in steps a segmental distance determined by the spacing of the teeth on the ratchet 51. The inner faces of the reel discs 4 and 5 are provided with a plurality of grooved trackways 65 corresponding in number and disposition to the number of teeth on the ratchet 51. These trackways 65 each comprise parallel ribs 66 and 67, Fig. 8, which project inwardly from the respective discs 4 and 5 as is best illustrated in Figs. 1, 4 and 5.

While it is possible that the trackways 65 may be disposed radially upon the respective discs, such disposition would require a substantially larger reel than is shown herein. For purposes of the present invention the trackways 65 are preferably of spiral configuration to accommodate a long film within a reel of relatively smaller diameter. Moreover, by forming the trackways with a slight curvature the film will be flexed thus assuring against buckling of the film in a transverse direction which would result in dislodgement of the film from the supporting grooves or trackways 65.

The inner ends of the trackways are closed by an end wall 68 so as to limit movement of the film toward the hub of the reel. In this manner a sufficient internal chamber is provided around the hub for circulation of developing solution during the developing bath. The outer ends of the trackways are open to provide a mouth 69 at the periphery of the real discs and the several mouths 69 are spaced from each other a segmental distance corresponding with the segmental divisions between the ratchet teeth 55.

Under normal operation of the device as illustrated in Fig. 5 the mouth 69 of a particular set of trackways 65' of the reel will be disposed substantially below the arm 31 of the frame 30. This arm 31 is formed to provide a funnel 70 having a widened entrance terminating in a slot 71 at the lower surface of the arm. The slot 71 registers with the mouths 69 of the particular set of trackways normally disposed therebelow and the side wall of the funnel nearest the person operating the device is substantially tangent to the lower-most ribs 66 of the particular trackways.

Since the loading of the reel must be done under darkness it will be apparent that a person holding the loader with right hand can easily judge and control the disposition of the funnel 70 and with left hand guide a film into the funnel. From the foregoing description it will be apparent that once the leading edge of a film so guided lies within the funnel the insertion of the film completely within the confines of the reel discs is a simple matter.

As was hereinbefore explained a film having its side edges within a pair of trackways 65 will be flexed lengthwise and therefore transversely rigidified to assure against displacement of the film from between the discs 4 and 5. It will be noted that the funnel 70 is provided with a well 73 formed by the concave recesses 74 and 75 in the opposite side walls of the funnel. This well 73 is for the purpose of enabling a person extending a finger of his left hand through the funnel to drive the film being inserted all the way to the bottom of the trackways 65. The well 73 has further uses, for instance, in the event the operator is interrupted during loading and in resuming has forgotten whether he has filled a set of trackways or not, he may insert one of his fingers into the well 73 to ascertain whether a film has already been deposited in the trackways registered with the funnel. If there is a film in the trackways registered with the funnel its outer edge will be within reach of his finger.

Referring to Figs. 1 and 5 it will be noted that the rib 67 against which the flexed film tends to bear is provided with a barb 76 adjacent the mouth 69 of the trackway. These barbs form an abutment against which the outermost edge of the film will bear to prevent accidental movement of the film outwardly of the trackways. In this connection it is pointed out that the reel, after being detached from the loader, is often turned in the developing bath or the solution in the developing tank agitated which could cause displacement of a film were it not securely confined within the trackways of the reel.

It was previously pointed out that the reel walls 4 and 5 are adjustable relative to each other for accommodating film of different width. The funnel 70 is also adapted to be conditioned for accommodating wide, medium and narrow film by the provision of a baffle plate 80, Fig. 6, insertable into one or another of the grooves 12', 13' and 14' formed in the opposite side walls of the funnel. These grooves 12', 13' and 14' are spaced from each other to correspond with the recesses 12, 13 and 14 cooperating with the detent 11 of the key spring 9 which maintains the reel discs 4 and 5 at the desired spacing. Consequently when the reel is adjusted to either wide, medium or narrow position and the baffle plate 80 is placed in the corresponding set of grooves 12', 13' or 14', respectively, film of the proper width can be inserted by way of the funnel with positive assurance that the film will be lodged within the confines of the reel as explained above.

It will be apparent to those skilled in the art that the device described herein is but one specific form and structural aspect of the invention which is susceptible to variations and modifications without departure from the spirit of the invention. I therefore desire to avail myself of all modifications, variations and alterations in structure coming within the purview of the appended claims.

What I claim as new and desire to protect by Letters Patent is:

1. A reel loader comprising a film guide, a handle for said film guide, spring loaded means on said handle adapted to receive a film supporting reel, and means on said handle cooperating with a reel on said spring loaded means for effecting intermittent release of the spring loaded means with reel thereon.

2. A reel loader comprising a film guide, a handle for said film guide disposed at right angle thereto, a spring loaded spindle on said handle for receiving and supporting a film supporting reel with its periphery adjacent to said film guide so as to receive film guided thereby, and means on said handle adapted to operatively engage the reel on said spindle and including a thumb actuated lever for effecting intermittent release of said spindle and reel thereon.

3. A reel loader comprising a film guide, a handle for said film guide, a spring loaded spindle on said handle for receiving a film supporting reel with its periphery disposed to receive film guided by said film guide, means for releasably securing a reel to said spindle for rotation therewith, and means on said handle including a thumb actuated lever for effecting intermittent release of said spindle with reel thereon.

4. Apparatus for loading cut film into a reel of the type having a series of film holding means thereon, comprising a spindle for receiving said reel for rotating the same, a hand grip for supporting said spindle, spring means between said hand grip and spindle for urging the reel in one rotary direction, said hand grip having an arm extending therefrom at the periphery of the reel, from end wall to end wall thereof parallel to the axis of said spindle, said arm having a film guiding slot registerable with one set of said film holding means at a time, and an escapement mechanism between said hand grip and reel for effecting consecutive registration of successive film holding means of the reel with the film guiding slot of said arm.

5. Apparatus for setting up cut film preparatory to developing thereof comprising a reel having film holding slots on its end walls, a reel loader comprising a hand grip disposed adjacent one end wall of said reel and an arm extending therefrom transversely of and at the periphery of said reel, said arm being formed to provide a film inserting slot extending from wall to wall of said reel, a spring loaded spindle carried by said hand grip and adapted to releasably receive said reel for rotating the latter, said reel having a ratchet on its side wall adjacent said knob, and a control mechanism having a thumb lever in proximity to said hand grip for effecting intermittent release of said reel under the influence of said spring loaded spindle for automatically disposing consecutive film holding slots of said reel in successive registration with the film inserting slot of said reel loader arm.

6. Apparatus for setting up cut flat film preparatory to development thereof comprising a reel having parallel side discs provided with a plurality of sets of film retaining grooves on their inner walls, a loader for said reel comprising a funnel adapted to span and overlie the periphery of said discs in registration with the mouths of one set of said film retaining grooves and an arm terminating in a hand-holding knob, a spindle mounted on said knob and projecting into the hub of said reel, means for keying said spindle and reel, spring means between said arm and spindle for urging the latter and said reel in one direction of rotation relative to said holder, and means for controlling rotative movement of said reel for effecting successive registrating of consecutive sets of said film retaining grooves with said funnel.

7. Apparatus for setting up cut flat film preparatory to development thereof comprising a reel having spaced side discs provided with a plurality of sets of film retaining grooves on their inner walls, a loader comprising an L shaped arm including a film receiving funnel adapted to register with one set of said film retaining grooves and an arm terminating in a knob adapted to lie adjacent one disc of said reel, a spindle rotatably mounted on said knob and adapted to be coupled to said reel for unitary rotation therewith, means on said arm for normally urging said spindle and reel in one rotary direction, and an escapement mechanism operatively associated with said arm and said reel for controlling the rotary movement of the latter to thereby effect consecutive registration of successive film retaining grooves on said reel with the funnel of said loader.

8. Apparatus for setting up cut film preparatory to development thereof comprising a reel having spaced side discs provided with a plurality of sets of film retaining grooves on their inner walls, a loader comprising an L shaped arm including a film guiding funnel adapted to register with one set of said film retaining grooves and an arm terminating in a knob adapted to lie adjacent one disc of said reel, a spindle rotatably mounted on said knob and adapted to support said reel, means on said reel for drivingly connecting the same to said spindle for unitary rotation therewith, means for normally urging said spindle and reel in one rotary direction, a ratchet carried by the reel disc adjacent said arm, and a ratchet control structure carried by said arm and including a lever in proximity to the thumb of the hand in which the knob is grasped for effecting a step by step release of said reel for successively registering consecutive sets of film retaining grooves of said reel with the film guiding funnel.

9. Apparatus for setting up cut film preparatory to development thereof comprising a reel and a loader therefor, said reel having a plurality of sets of film holding means of substantially helical configuration provided with mouths opening onto the periphery of said reel, said loader comprising a funnel and a handle disposed at right angle with respect to each other, a spindle carried by said handle for supporting said reel with its periphery disposed adjacent said funnel, said funnel having a slot in its lower surface adapted to register with the mouths of one set of said film holding means, said funnel having one of its side walls disposed substantially tangent to the helical configuration of the set of film holding means registered with the slot thereof, spring means on said handle for urging said spindle and reel in one particular direction, and an escapement mechanism associated with said reel and said handle to facilitate control of the movement of said reel in segmental steps for successively registering consecutive sets of film holding means with the slot of said funnel.

10. Apparatus for setting up cut film preparatory to development thereof comprising a reel having parallel discs spaced from each other on a telescoping hub portion, means for releasably setting said discs in a desired standard spaced relation, a reel loader including a reel mounting spindle, means for advancing said spindle and reel in predetermined intermittent segmental steps, a film guide fixedly mounted on said loader in parallel relation to said spindle and having a feed slot disposed at the periphery of said reel for guiding film into said reel, and means on said film guide for optionally restricting or enlarging the latter in accordance with the setting of said discs.

ESAU SHIMIZU.

REFERENCES CITED

The following references are of record in the file of this patent:

UNITED STATES PATENTS

| Number | Name | Date |
|---|---|---|
| 1,164,773 | Woodman | Dec. 21, 1915 |
| 2,297,525 | Anheuser | Sept. 29, 1942 |
| 2,325,823 | Wilson | Aug. 3, 1943 |
| 2,344,710 | McMurtry | Mar. 21, 1944 |
| 2,436,882 | Edelhart | Mar. 2, 1948 |
| 2,458,699 | Ginsberg | Jan. 11, 1949 |

FOREIGN PATENTS

| Number | Country | Date |
|---|---|---|
| 634,464 | Germany | Aug. 27, 1936 |